July 8, 1952
R. N. FALGE ET AL
2,602,367
TRAFFIC SIGNAL VIEWER
Filed March 31, 1949
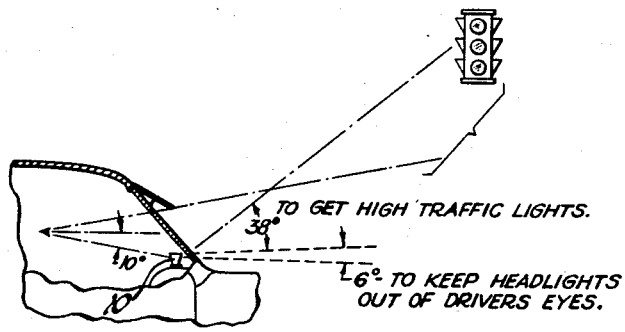
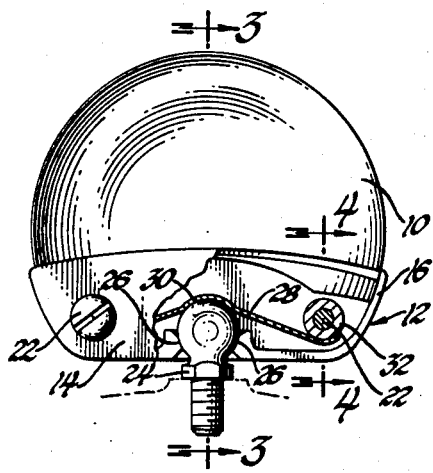
Inventors
Robert N. Falge &
George W. Onksen, Jr.
By Spencer, Willits, Helmig & Baillio
Attorneys Patented July 8, 1952

2,602,367

UNITED STATES PATENT OFFICE 2,602,367

TRAFFIC SIGNAL VIEWER

Robert N. Falge and George W. Onksen, Jr., Anderson, Ind., assignors to General Motors Corporation, Detroit, Mich., a corporation of Delaware Application March 31, 1949, Serial No. 84,627

3 Claims. (Cl. 88—1)

The present invention relates to optical devices and more particularly to a lens adapted to be attached to an automotive vehicle for observing traffic signal lights.

Frequently traffic signal lights are placed in an overhanging position at traffic intersections to provide a signal traffic light for the intersection. Because of the operator's position in the enclosed cab structure of an automobile a direct view of the traffic light may be obstructed by the cab structure as the vehicle approaches an intersection. Accordingly, it is desirable to provide means enabling the operator to observe the signal light at all times even though the light may be obstructed from the operator's direct view by the automobile cab structure.

It is therefore an object of the present invention to provide an improved optical viewing device for automobiles.

It is a further object of the present invention to provide a lens adapted to be mounted adjacent the windshield of an automobile to enable the operator to observe an overhanging traffic signal obstructed from the operator's direct view by the cab structure.

It is still a further object of the present invention to provide an improved mounting means for a traffic signal viewing lens.

Further objects and advantages will be apparent as the description proceeds and the features of novelty which characterize the invention will be pointed out with particularity in the claims annexed to and forming a part of this specification.

For a better understanding of the invention reference may be had to the accompanying drawings in which Figure 1 is a fragmentary view in side elevation of the cab of an automobile illustrating a traffic viewer embodying the present invention mounted on the horizontal panel of the dash; Figure 2 is a front view of the traffic viewer with parts broken away and in section; Figure 3 is a view taken along the line 3—3 of Figure 2; Figure 4 is a view taken along the line 4—4 of Figure 2 and Figure 5 is a view illustrating the optical diagram of the traffic viewer lens.

Referring now to the drawings and particularly to Figure 1, there is shown an automobile cab structure with parts broken away to illustrate a traffic signal viewer embodying the present invention mounted on the horizontal dash panel of the vehicle. The viewer comprises a lens, a support for the lens and means for adjustably securing the lens and support to the dash panel. In the position shown the lens characteristics of the viewer adapt it to intercept light from a light source such as overhanging traffic lamps within a vertical angle of substantially 38 degrees from a reference line angularly displaced vertically by about 6 degrees from the longitudinal axis of the vehicle. The viewer is mounted with the lower angular interception limit on a line angularly displaced from the longitudinal axis of the vehicle to avoid the transmission of light from an oncoming vehicle's headlights to the operator's eye. Further, the lens characteristics of the viewer are such that light transmitted by the viewer lens from an object within the interception angle will be directed upwardly to the eye of the vehicle operator along a path angularly displaced vertically from the longitudinal axis of the vehicle by an angle of substantially 10 degrees. To provide a suitable horizontal field of view, the lens is provided with the diverging characteristics of a double concave lens. With the aforementioned characteristics the viewer may be mounted as shown to provide an unobstructed forward view for the operator through the vehicle windshield.

The viewer is illustrated in Figures 2 and 3 of the drawings as comprising a double concave lens 10 clamped in an adjustable mounting 12. To provide the optical characteristics desirable for a viewer, the lens body is formed substantially in the shape of a wedge bounded by a generally cylindrical surface and two concave surfaces and has substantially the same optical characteristics as a segmental element of a double concave lens. The body 10 is made of a material having suitable light-transmitting characteristics such as the polymerized methyl-methacrylate thermoplastic resin commonly known as "Lucite." Of course it will be understood that glass or other materials having suitable light-transmitting characteristics would be satisfactory for forming the lens body. To provide the optical properties considered desirable in a traffic signal viewer for automobiles the opposite ends of the semi-cylindrical body are formed with concave surfaces which are angularly disposed at equal angles from the vertical axis of the body. The concave surfaces are subsequently polished or buffed to a suitable degree of smoothness. To prevent light-transmission through the cylindrical surface of the body and avoid objectionable reflections from the windshield, the cylindrical surface may be coated with a material opaque to light, such as paint, or it may be sand-blasted. Such surfaces provide acceptable performance and a desirable appearance.

The lens 10 is clamped between the cooperating side plates 14 and 16 of the mounting member 12 by the inwardly extending angular projections 18 which engage grooves 20 in the lens body, as shown in Figure 4. The lens and side plates of the mounting member are held in assembled relationship by the screw-threaded members 22.

Adjustability of the viewer about its vertical axis is obtained by clamping a ball-headed screw 24 between the cooperating side plates of the mounting member with the ball head engaging a seat 26 formed in the side plates as shown. To provide a biasing force for maintaining the viewer in an adjusted position a spring 28, having a recessed seat 30, is positioned in the mounting member with its ends in engagement with lugs 32 extending from the wall of the side plate 16 and its recessed seat in engagement with the ball-headed screw 24.

The optical characteristics of the lens 10 are diagrammatically illustrated in Figure 5 wherein the light from an object A in being transmitted through the lens body both refracted as in a prism and caused to diverge as in a double concave lens providing a virtual, erect and diminished image B downwardly displaced from object A.

While the embodiment of the present invention as herein disclosed constitutes a preferred form, it is to be understood that other forms might be adopted, all coming within the scope of the claims which follow.

What we claim and desire to obtain by Letters Patent of the United States is:

1. A traffic signal viewing device comprising a refracting prismatic lens segment, said segment being wedge-shaped in cross section and having opposed concave faces, means for mounting said segment near the bottom of a vehicle windshield and substantially below the line of normal view through the windshield, with the thicker portion of the segment uppermost, said segment providing a wide lateral and vertical field of view while preventing transmission through it and into the field of view of light rays parallel to the longitudinal axis of the vehicle and coming from below a horizontal plane, passing through the segment, securing means for the segment engaging the segment solely at its lower extremity and leaving its remaining portion unobstructed, and pivotal adjustment means between the securing means and the mounting means.

2. A traffic signal viewing device comprising a refracting prismatic lens segment, wedge-shaped in cross section and having opposed concave faces, means for mounting said segment in rear of a vehicle windshield and substantially below the normal line of view through the windshield with the wider portion of the segment uppermost to refract light received from a source above the vehicle and render it visible to the driver, clamping means engaging said concave faces near the bottom extremity of the segment for securing the segment to said mounting means, and a pivot means between the clamping and mounting means to provide adjustment of the segment with respect to the eyes of the driver, whereby neither the clamping means nor the segment obstructs the normal field of view of the driver.

3. A traffic signal viewing device comprising a refracting prismatic lens segment, wedge-shaped in cross section and having opposed concave faces, means for mounting said segment in rear of a vehicle windshield and substantially below the normal line of view through the windshield with the wider portion of the segment uppermost to refract light received from a source above the vehicle and render it visible to the driver, clamping means engaging said concave faces near the bottom extremity of the segment for securing the segment to said mounting means, said last mentioned means comprising a pair of jaws engaging with cooperating portions on the lower portions of the concave faces, and a pivot means between the clamping and mounting means to provide adjustment of the segment with respect to the eyes of the driver, whereby neither the clamping means nor the segment obstructs the normal field of view of the driver.

ROBERT N. FALGE.
GEORGE W. ONKSEN, Jr.

REFERENCES CITED

The following references are of record in the file of this patent:

UNITED STATES PATENTS

| Number | Name | Date |
|---|---|---|
| 1,324,456 | Lutz | Dec. 9, 1919 |
| 1,506,727 | Rampp | Aug. 26, 1924 |
| 1,637,309 | David | July 26, 1927 |
| 1,683,951 | Buttron | Sept. 11, 1928 |
| 1,731,284 | Andel et al. | Oct. 15, 1929 |
| 1,883,296 | Johnson | Oct. 18, 1932 |
| 1,938,541 | Oishei | Dec. 5, 1933 |
| 2,114,767 | La Hodny et al. | Apr. 19, 1938 |